US012033509B2

United States Patent
Sen et al.

(10) Patent No.: US 12,033,509 B2
(45) Date of Patent: *Jul. 9, 2024

(54) METHOD AND SYSTEM FOR DYNAMIC MOBILE DATA COMMUNICATION

(71) Applicant: SPACES OPERATIONS, LLC, New York, NY (US)

(72) Inventors: Sourabh Sen, New York, NY (US); Ben Quintana, New York, NY (US)

(73) Assignee: SPACES OPERATIONS, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,447

(22) Filed: Jul. 26, 2022

(65) Prior Publication Data

US 2022/0375020 A1 Nov. 24, 2022

Related U.S. Application Data

(63) Continuation of application No. 16/897,649, filed on Jun. 10, 2020, now Pat. No. 11,430,333.

(51) Int. Cl.
*G08G 1/14* (2006.01)
*G06N 3/08* (2023.01)
(Continued)

(52) U.S. Cl.
CPC .............. *G08G 1/141* (2013.01); *G06N 3/08* (2013.01); *G06N 20/00* (2019.01); *G06Q 50/40* (2024.01);
(Continued)

(58) Field of Classification Search
CPC ........ G08G 1/141; G08G 1/144; G06N 20/00; G06N 3/08; G06Q 50/30; H04L 63/08; H04L 69/329
(Continued)

(56) References Cited

U.S. PATENT DOCUMENTS 6,405,125 B1    6/2002  Ayed
6,850,841 B1 *  2/2005  Casino .................. G01C 21/26
                                                   701/461
(Continued)

FOREIGN PATENT DOCUMENTS

CN    109252804 A    1/2019
CN    109637191 A    4/2019
(Continued)

OTHER PUBLICATIONS

ISR PCT/IB2021/055099, 1 page, Oct. 14, 2021.
(Continued)

*Primary Examiner* — Kerri L McNally
*Assistant Examiner* — Thang D Tran
(74) *Attorney, Agent, or Firm* — Darrell G. Mottley

(57) ABSTRACT

Methods, systems, and computing platforms for mobile data communication are disclosed. The processor(s) may be configured to receive a plurality of user mobile parking beacon data and storing the user mobile parking beacon data in a computer readable database for a mobile device. The processor(s) may be configured to process the user mobile parking beacon data with a machine learning processor as to output at least one most probable lane location vector associated with the mobile device. The processor(s) may be configured to electronically output the at least one most probable lane location vector to a parking processing module.

7 Claims, 12 Drawing Sheets

(51) Int. Cl.
  *G06N 20/00* (2019.01)
  *G06Q 50/40* (2024.01)
  *H04L 9/40* (2022.01)
  *H04L 69/329* (2022.01)

(52) U.S. Cl.
  CPC .............. *G08G 1/144* (2013.01); *H04L 63/08* (2013.01); *H04L 69/329* (2013.01)

(58) Field of Classification Search
  USPC ...................................................... 340/932.2
  See application file for complete search history.

(56) References Cited

U.S. PATENT DOCUMENTS

| | | | |
|---|---|---|---|
| 7,869,582 B2 | 1/2011 | Styers et al. | |
| 7,953,402 B2 | 5/2011 | Carolan et al. | |
| 8,558,697 B2 | 10/2013 | Clough | |
| 11,086,318 B1 | 8/2021 | Davis et al. | |
| 2003/0074479 A1* | 4/2003 | Makioka | H04L 9/40 709/250 |
| 2005/0151846 A1 | 7/2005 | Thornhill | |
| 2006/0290519 A1 | 12/2006 | Boate et al. | |
| 2009/0138961 A1* | 5/2009 | Lin | H04L 61/2585 726/15 |
| 2009/0309759 A1 | 12/2009 | Williams | |
| 2010/0316046 A1 | 12/2010 | Kalmanek, Jr. et al. | |
| 2013/0117078 A1* | 5/2013 | Weik, III | G06Q 10/00 705/13 |
| 2013/0143536 A1* | 6/2013 | Ratti | G08G 1/147 455/414.1 |
| 2014/0114556 A1* | 4/2014 | Pan | G08G 1/00 701/119 |
| 2014/0335897 A1* | 11/2014 | Clem | H04W 4/021 455/456.3 |
| 2014/0368601 A1* | 12/2014 | deCharms | H04N 7/148 348/14.02 |
| 2015/0116075 A1 | 4/2015 | Cregg et al. | |
| 2015/0126119 A1 | 5/2015 | Schulz et al. | |
| 2015/0356498 A1 | 12/2015 | Casanova et al. | |
| 2016/0125514 A1* | 5/2016 | Plattenburg | H04W 4/029 705/26.9 |
| 2016/0140846 A1* | 5/2016 | Outwater | G08G 1/144 340/932.2 |
| 2016/0173696 A1* | 6/2016 | Nortz | H04M 7/0075 370/250 |
| 2016/0204879 A1* | 7/2016 | Niewczas | H04B 11/00 455/41.1 |
| 2016/0368489 A1* | 12/2016 | Aich | B62D 15/0285 |
| 2016/0379495 A1 | 12/2016 | Engelen et al. | |
| 2017/0061508 A1* | 3/2017 | Sen | G08G 1/144 |
| 2017/0069211 A1* | 3/2017 | Khurana | G08G 1/146 |
| 2017/0127373 A1 | 5/2017 | Deshpande et al. | |
| 2017/0241791 A1 | 8/2017 | Madigan et al. | |
| 2018/0039974 A1* | 2/2018 | Powell | G08G 1/144 |
| 2018/0300816 A1* | 10/2018 | Perl | G06Q 50/01 |
| 2019/0056231 A1 | 2/2019 | Bai et al. | |
| 2019/0096252 A1 | 3/2019 | Tucker | |
| 2019/0098725 A1 | 3/2019 | Sadwick et al. | |
| 2019/0122449 A1* | 4/2019 | Rosas-Maxemin | G07B 15/02 |
| 2019/0130748 A1* | 5/2019 | Woo | G08G 1/143 |
| 2019/0130750 A1* | 5/2019 | Cole | G06F 16/958 |
| 2019/0205847 A1* | 7/2019 | Cho | G08G 1/147 |
| 2019/0287052 A1* | 9/2019 | Sundar | G06Q 10/06311 |
| 2019/0394159 A1 | 12/2019 | Gosalia | |
| 2020/0070814 A1* | 3/2020 | Park | B62D 15/0285 |
| 2020/0090519 A1 | 3/2020 | Ding et al. | |
| 2020/0134332 A1* | 4/2020 | Vossoughi | H04W 4/023 |
| 2020/0151611 A1* | 5/2020 | McGavran | G06N 20/00 |
| 2020/0250896 A1* | 8/2020 | Vossoughi | H04W 4/24 |
| 2020/0250979 A1* | 8/2020 | Sentis Ros | G07C 1/30 |
| 2020/0410853 A1 | 12/2020 | Akella et al. | |

FOREIGN PATENT DOCUMENTS

| | | |
|---|---|---|
| CN | 109707205 A | 5/2019 |
| JP | 2017222295 A | 12/2017 |
| WO | 2018226600 A1 | 12/2018 |

OTHER PUBLICATIONS

King Pigeon, "GPRS/3G Gate Opener Remote Access Control, RTU5025 Series User Manual," Ver. 1.7, dated Mar. 25, 2016, retrieved from http://www.3g-rtu.com/UploadFiles/20160325/RTU5025%20GPRS%203G%20Gate%20Opener%20User%20Manual%20V1.7.pdf, 17 pages.

Nevon Projects, "DTMF Cell Phone Based Door Opener," Nov. 8, 2019, retrieved from https://nevonprojects.com/dtmf-door-opener/, 10 pages.

"ARBOL Automatic Swing Gate Operators," retrieved Jun. 5, 2020 from https://www.indiamart.com/proddetail/automatic-swing-gate-operators-15071779012.html, 11 pages.

Bamisaye, et al., "Design of a Mobile Phone Controlled Door: A Microcontroller based Approach," J Electr Elecron Syst 2016, 5:1, doi:10.4172/2332-0796.1000167, 5 pages.

Apr. 22, 2022—(US) Notice of Allowance—U.S. Appl. No. 16/897,649.

Supplemental European Search report, EP21822956, Feb. 3, 2024, 2 pgs.

* cited by examiner

METHOD AND SYSTEM FOR DYNAMIC MOBILE DATA COMMUNICATION

RELATED APPLICATIONS

This application is a Continuation application of U.S. application Ser. No. 16/897,649, filed Jun. 10, 2020. The disclosure of the prior application is incorporated herein by its entirety.

FIELD OF THE DISCLOSURE

The present disclosure relates to methods, systems, and computing platforms for mobile data communication and parking with machine learning.

BACKGROUND

In the internet-of-things era, many digital products can be connected to the internet. Transparency of price and availability for parking, particularly off street parking, has been a challenge for users given the off-line nature of parking rates and inventory. Parking transactions remain inefficient. The general lack of real-time connection to parking company operational systems makes information outdated and inaccurate, even with the advent of recent user-facing parking applications. Enterprise organizations utilize various computing infrastructure to make decisions and trigger actions. The computing infrastructure may include computer servers, computer networks, and sensors. Such an environment may include the Internet of Things (IoT). Often time, an IoT environment generates a plethora of raw data that can overwhelm an enterprise organization. As the digital economy continues to develop, data management and security has become a formidable task in the internet-of-things era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

An aspect of the present disclosure relates to a system configured for mobile data communication. The system may include one or more hardware processors configured by machine-readable instructions. The processor(s) may be configured to receive a plurality of user mobile parking beacon data and storing the user mobile parking beacon data in a computer readable database for a mobile device. The processor(s) may be configured to process the user mobile parking beacon data with a machine learning processor as to output at least one most probable lane location vector associated with the mobile device. The processor(s) may be configured to electronically output the at least one most probable lane location vector to a parking processing module.

In some implementations of the system and method, the processor(s) may be configured to process the data with a deep machine learning processor. In some implementations of the system and method, the processor(s) may be configured to electronically receive a network call from a voice communications network and the network call being assigned to a barrier processor. In some implementations of the system and method, the processor(s) may be configured to electronically determine a network address associated with the network call. In some implementations of the system and method, the processor(s) may be configured to electronically transmit a data packet to a parking processing module, wherein the data packet includes at least one lane attribute data element and at least one channel attribute data element. In some implementations of the system and method, the processor(s) may be configured to electronically process the data packet to determine a vehicle attribute data element associated with the network address. In some implementations of the system and method, the processor(s) may be configured to electronically transmit a command to the barrier processor to open a movable barrier, such as a gate arm or garage door.

In some implementations of the system and method, the processor(s) may be configured to electronically convert the network address comprising a voice communication phone number. In some implementations of the system and method, the processor(s) may be configured to electronically transmit a digital command to the barrier processor to open a movable barrier associated with the at least one most probable lane location vector and the network address or voice communications phone number.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of a, an, and the include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
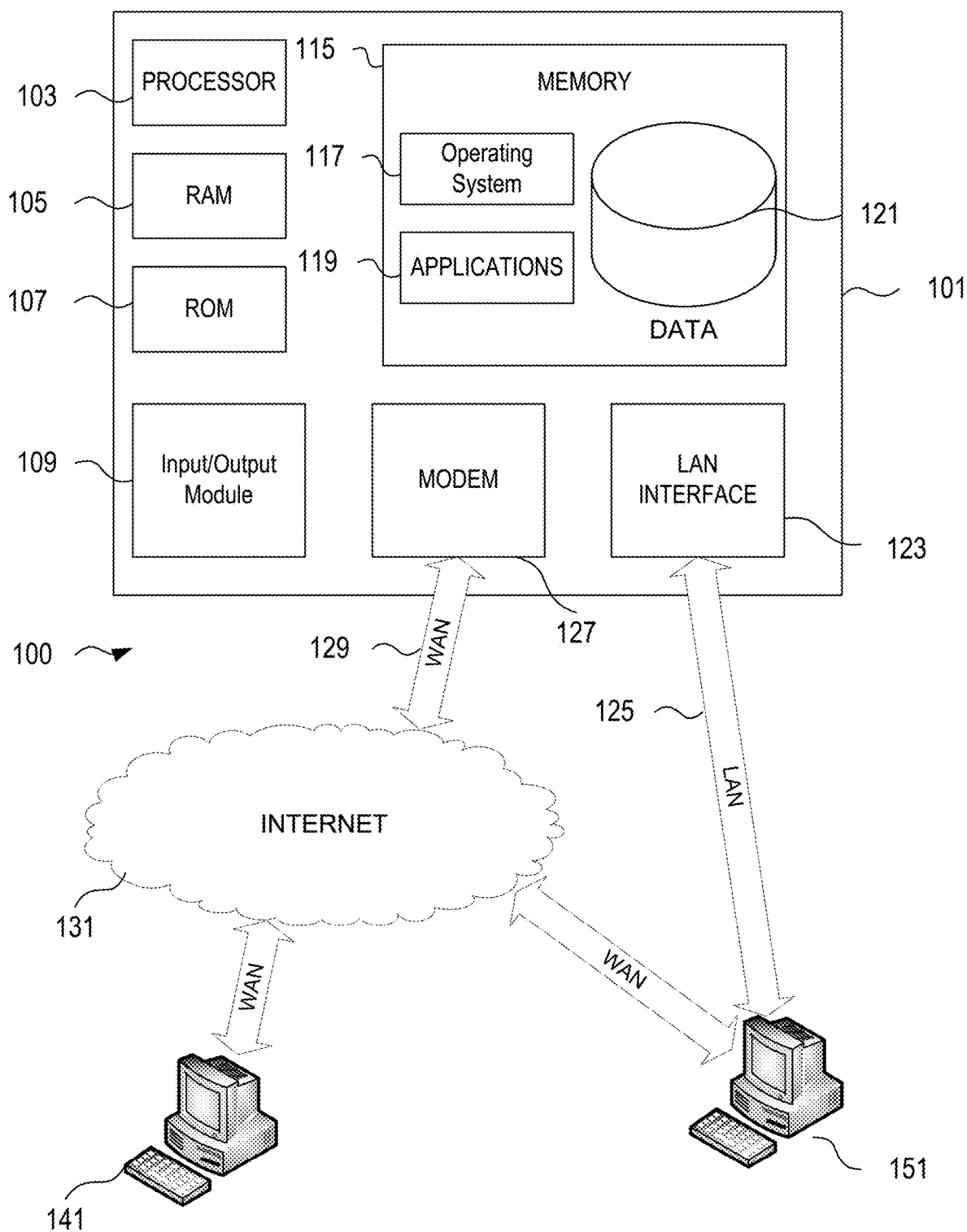
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a keyboard, microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
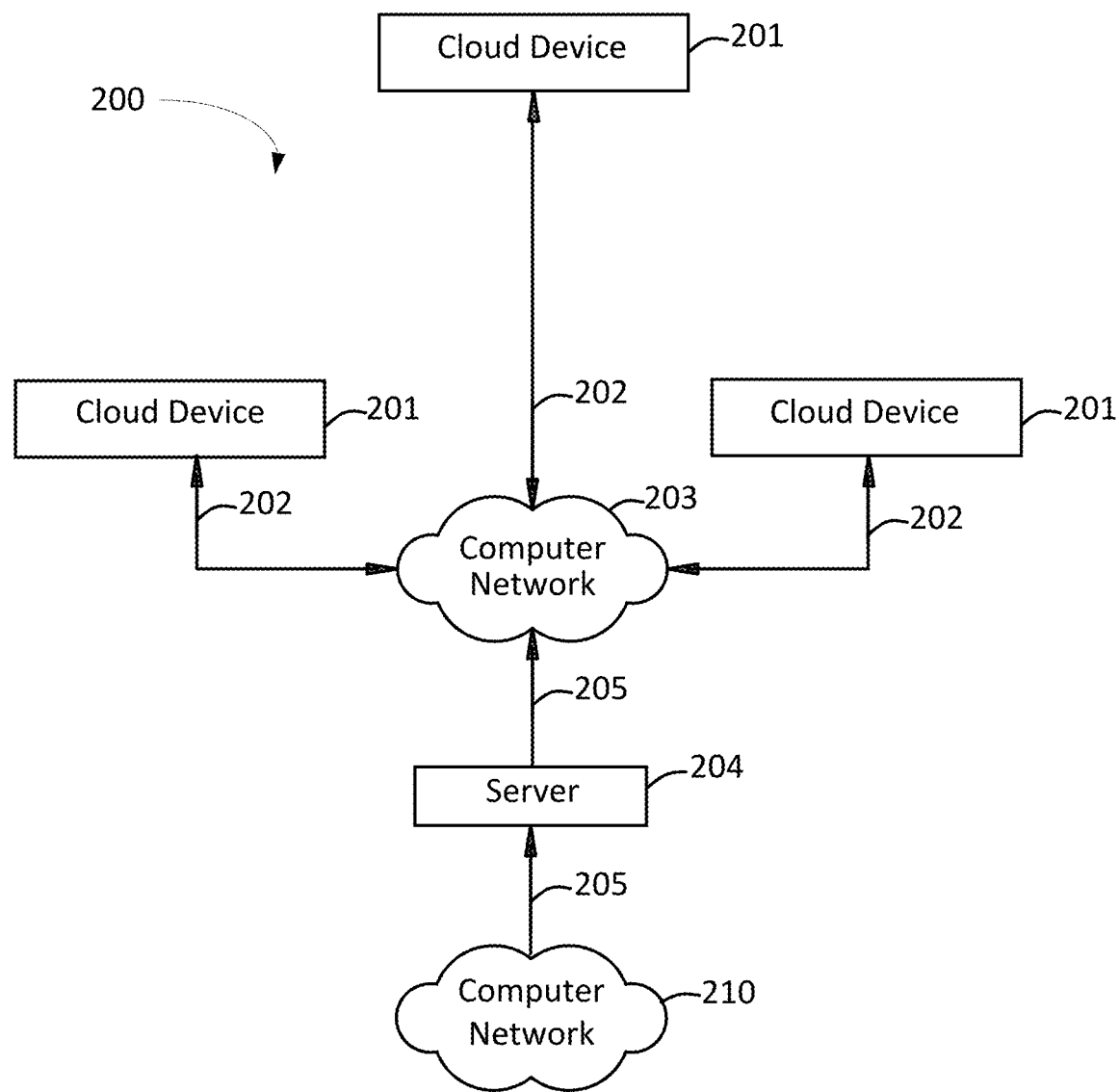
FIG. 2 is an illustrative block diagram of workstations and servers for cloud that may be used to implement the processes and functions of certain embodiments of the present disclosure.

Referring to FIG. 2, an illustrative system 200 for implementing methods according to the present disclosure is shown. The disclosure may be described in the context of cloud-based computing architecture employing Amazon Web Service (AWS). Nevertheless, other commercially available cloud-based services may be used, such as Microsoft Azure, and Google Cloud. As illustrated, system 200 may include one or more cloud devices 201. Cloud device 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same and made include sensors and relays for Internet of Things (IoT) devices. Communications links 202 and 205 may be any communications links suitable for communicating between cloud device 201 and server 204, such as network links, dial-up links, wireless links, hard-wired links, etc.

Figure 3:
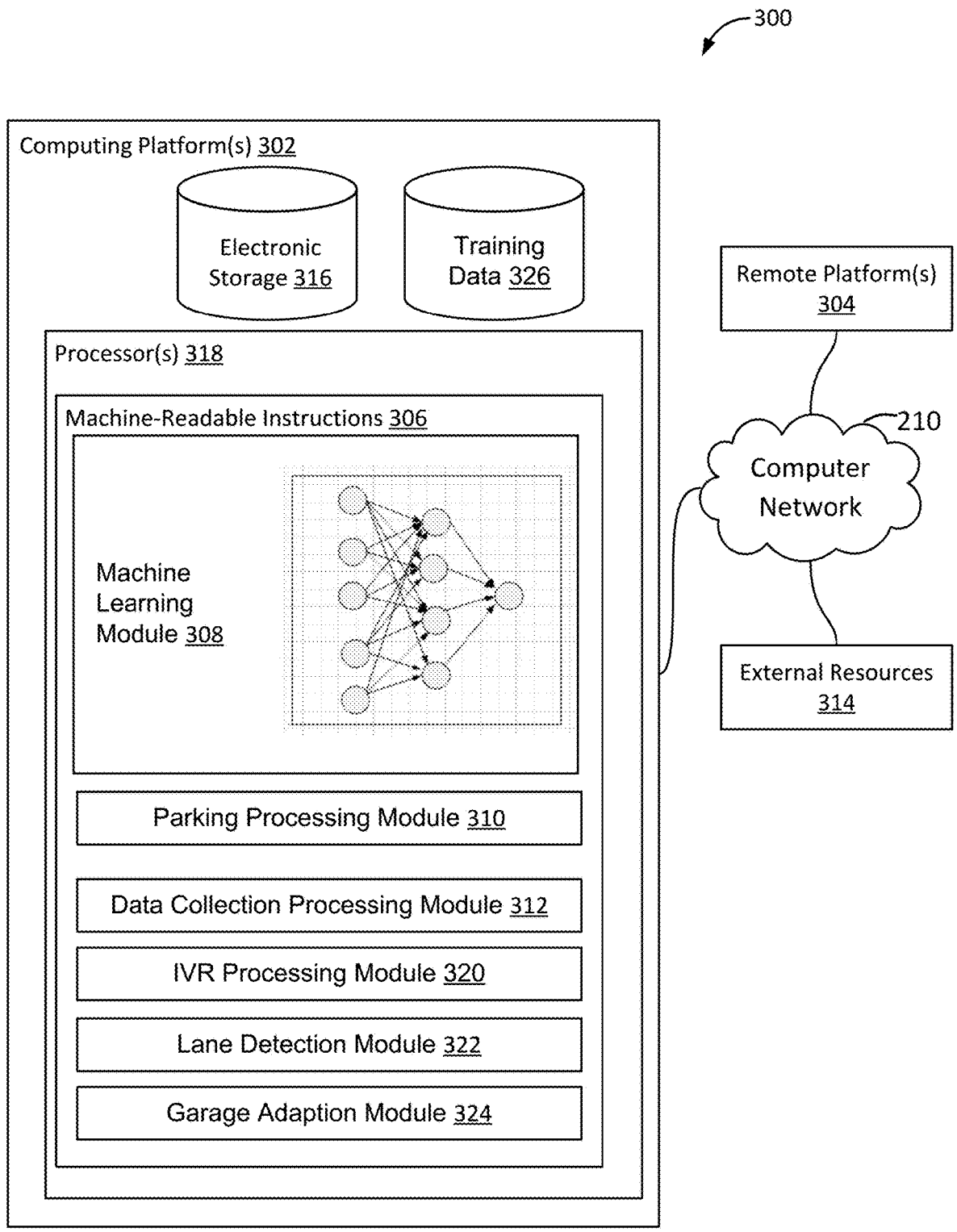
FIG. 3 illustrates a system configured for data communication, in accordance with one or more implementations.

FIG. 3 illustrates a system 300 configured for data communication, in accordance with one or more implementations. In some implementations, an operational and parking system 300 for garages paired with a consumer-facing mobile device 700 and computer implemented system and method for initiating and completing the processing of a transaction for one or multiple parking sessions. Garages conduct their parking operation in a cloud-based automated system 300 of executing and managing parking transactions, including rate determination, dynamic vehicle spot assignments and task management. In some implementations, the integrated system transmits updated pricing and availability information from garages to users, and user parking information to garages. The user, in real time, searches for, selects, reserves and pays for parking spots using underlying algorithms and data to facilitate the process. The underlying algorithms allow for a garage selection based on location, pricing and real-time availability using a three click system. The method comprises storing an identifier for each user/vehicle combination, and transmitting that identifier to a network server. The method further comprises an integrated platform for parking garages to gather real time information on demand and capacity as an operations and business strategy tool for garage management. The method further comprises using integrated targeted advertising to enable businesses to disseminate information to users.

In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of machine learning module 308, parking processing module 310, data collection processing module 312, IVR processing module 320, lane detection module 322, garage adaption module 324 and/or other instruction modules.

The modules 308, 310, 312, 320, 322, 324 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

Some aspects of various exemplary constructions are described by referring certain factors of data security and secure communications for system 300. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions.

Figure 5:
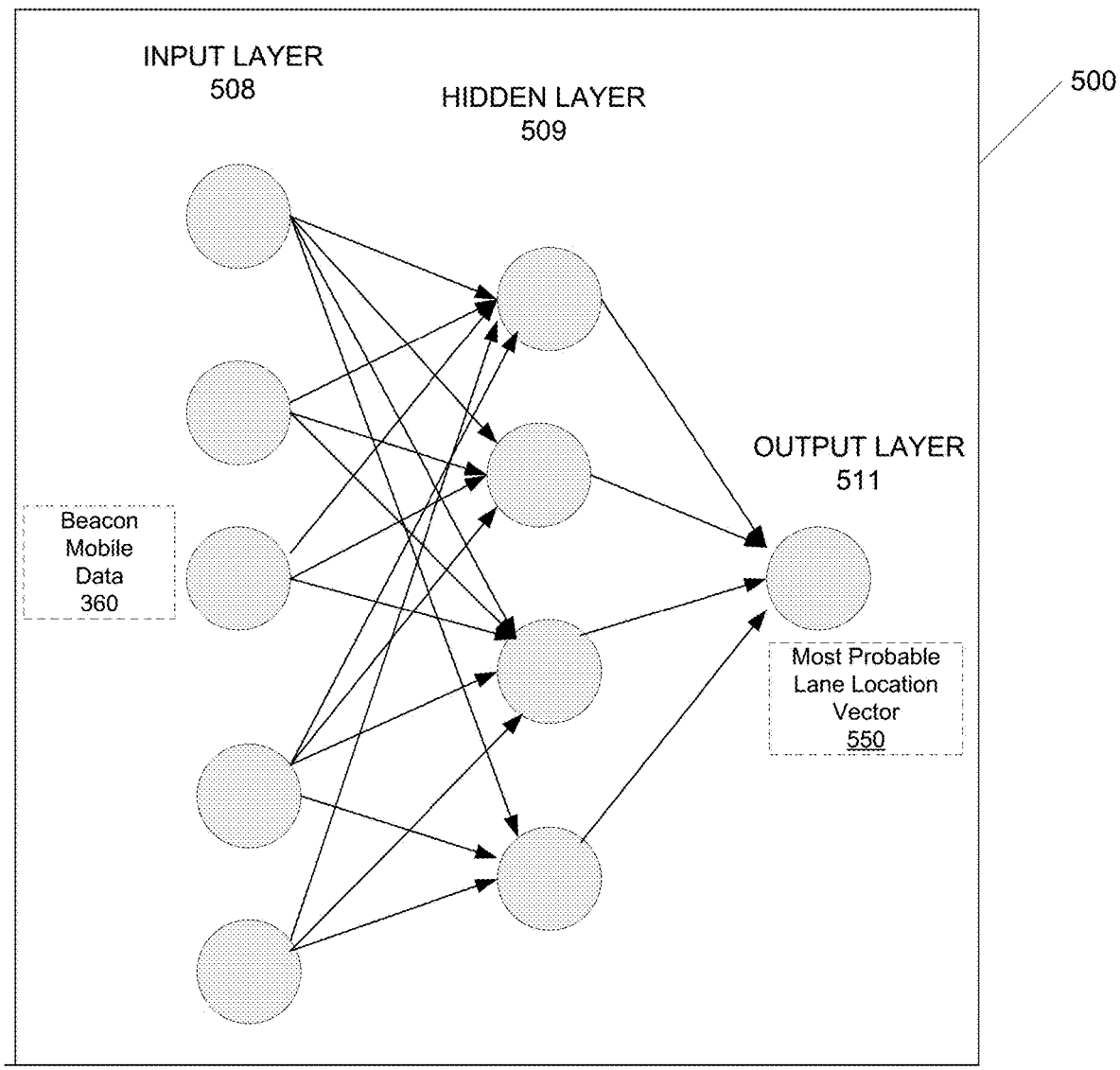
FIG. 5 is an illustrative functional block diagram of a neural network that may be used to implement the processes and functions, in accordance with one or more implementations.

Some aspects of various exemplary constructions are described by referring to and/or using neural network(s). Machine learning module 308 may be configured to electronically process with a machine deep learning processor. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. Computer networks 203, 201 may incorporate various machine intelligence (MI) neutral network 500 (see FIG. 5) features of available Tensorflow (https://www.tensorflow.org) or Neuroph software development platforms (which are incorporated by reference herein). Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets processes the input data. An output layer 511 provides the result of the processing of the network data.

The computer readable database 316 may include the "attribute data" including ASCII characters in computer readable form or binary complied data. The ASCII characters or binary data can be manipulated in the software of system 300.

Figure 6:
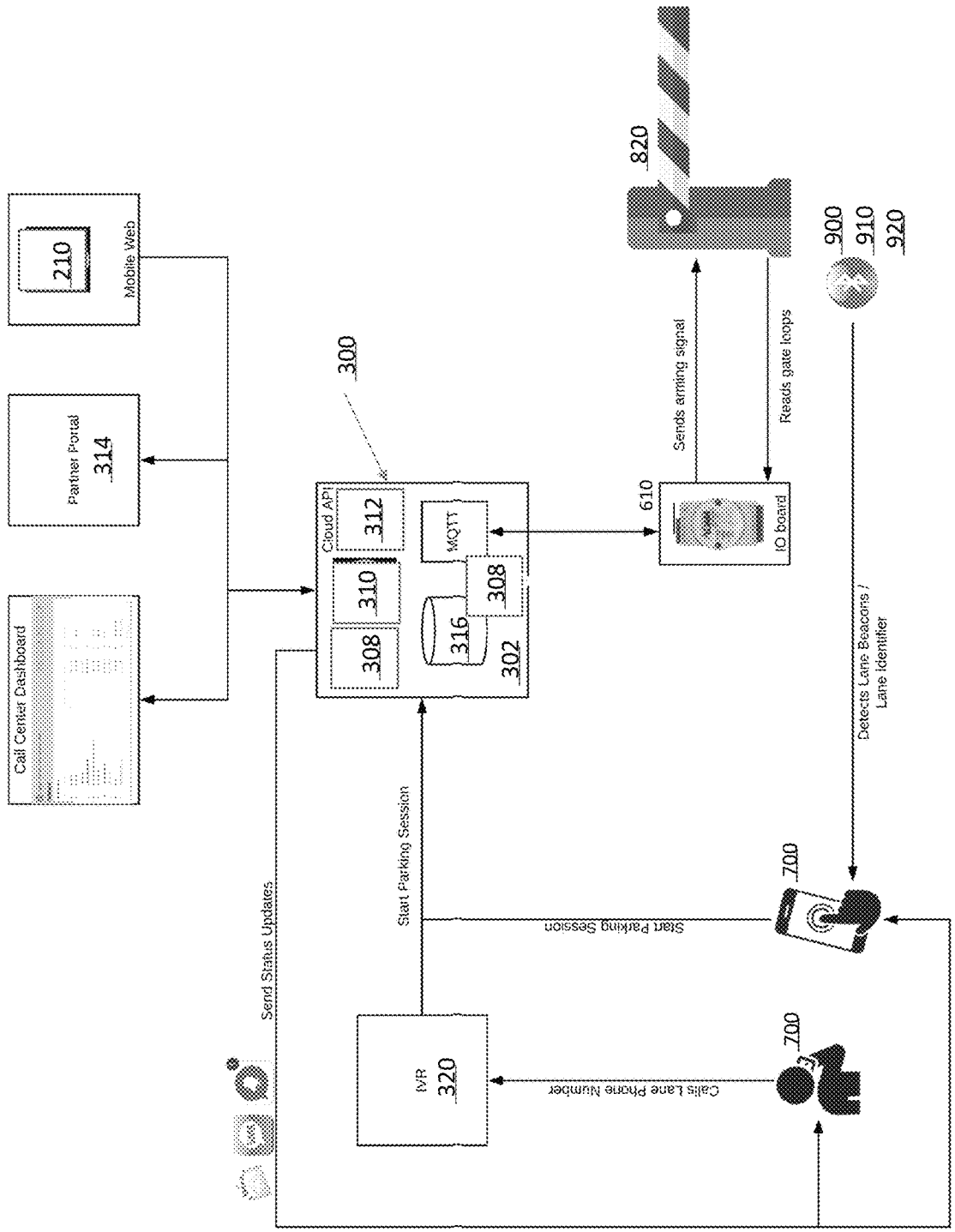
FIG. 6 is an illustrative block diagram of a parking system environment that may be used to implement the processes and functions of certain embodiments.
Figure 10A:
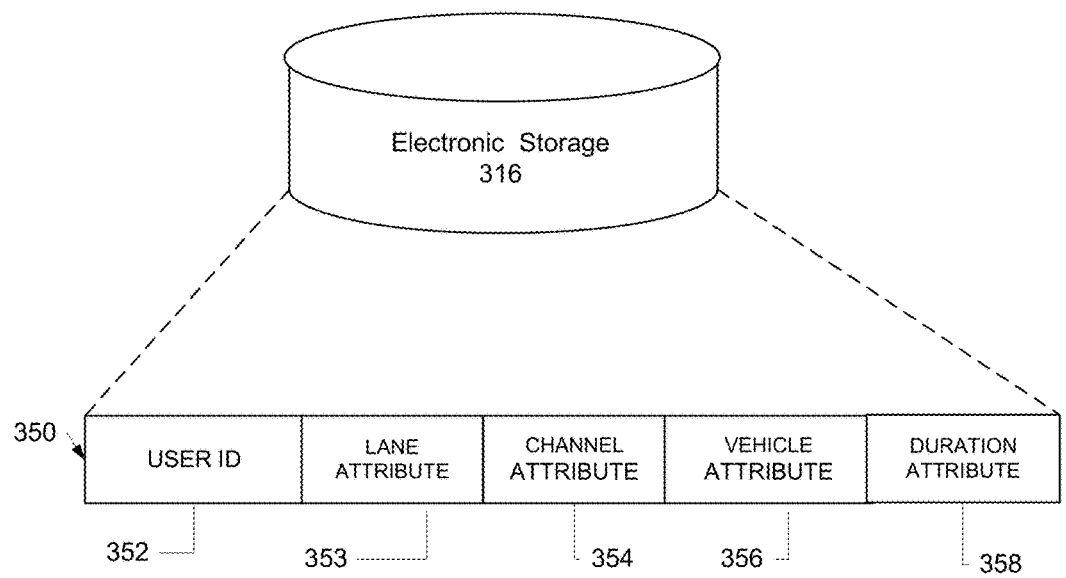
FIGS. 10A and 10B are illustrative block diagrams of a computer readable data structure that may be used to implement the processes and functions of certain embodiments.

With reference to FIGS. 3, 10A, and 6, modules 308, 310, 312, 320, 322 and other modules implement APIs implements attribute data about a user. The start parking session attribute data 350 relates to a unique user ID 352. The attribute data 353 pertains to the lane ID attribute associated sublocations within the parking structure. Channel ID attribute 354 pertains to the channel of interaction to start a parking session—phone or mobile web or phone application or beacon, for example. Vehicle attribute 356 pertains to the vehicle ID (in the case of multiple vehicles) of the user of the mobile device 700. Duration attribute 358 pertains to the length of time of the parking session measured in seconds, minutes, hours, day and the like.

With continued reference to FIGS. 3 and 5, machine learning module 308 implements machine learning techniques implementing a representation of learning methods that allows a machine to be given raw data and determine the representations needed for data classification. In some implementations, the machine learning module 308 may be configured to process user mobile parking beacon data 360 with a machine learning processor. The output layer 511 provides the result of the processing of the beacon data 360 as at least one most probable lane location vector 550 associated with the mobile device 700. By using deployment of machine learning software to implement processing, the computing system 300 may eliminate overhead to process the plethora of raw data that can overwhelm the enterprise and/or reduce processing overhead to improve response time and location variability. In one implementation, the module 308 may use deep learning. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

In some implementations, machine learning module 308, deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

In at least one implementation, machine learning module 308 includes deep learning technology that may utilize a convolutional neural network (CNN) segments data using convolutional filters to locate and identify learned, observable features in the mobile beacon user data 360. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, such as computer system diagrams, rather than looking for an object, it is more efficient to look for edges which form motifs which form parts, which form the object being sought. These hierarchies of features can be found in many different forms of data such as speech and text, etc.

In some implementations, learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given example training dataset.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine learning module 308 has been trained to operate according to a specified threshold, etc.), the machine learning module 308 can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

Figure 10B:
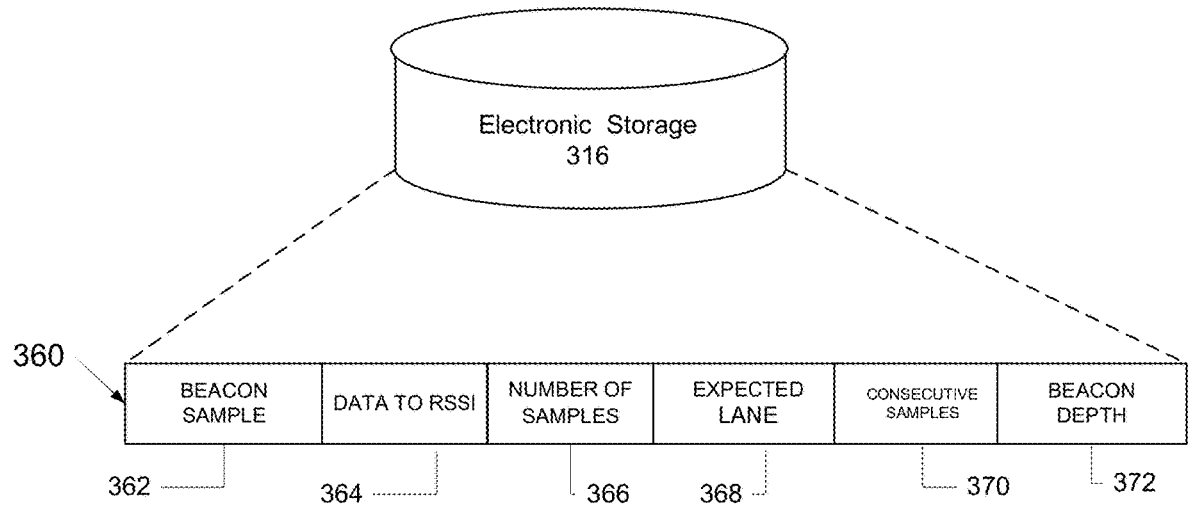

In some implementations, the machine learning module 308 may be configured to receive a plurality of user mobile parking beacon data 360 and storing the user mobile parking beacon data 360 in a computer readable database 316 (See FIG. 10B) for a mobile device 700. The machine learning module 308 may be configured to process the user mobile parking beacon data 360 with a machine learning processor as to output at least one most probable lane location vector 550 associated with the mobile device 700 (See FIG. 5). The machine learning module 308 may be configured to electronically output the at least one most probable lane location vector to parking processing module 310 to start a parking session. With reference to FIG. 10B, the user mobile parking beacon data 360 may include the samples taken, and measurements are processed. Other parking beacon data elements may include the minimum beacons 362 used for a triangulation sample. Other parking beacon data elements may include the triangulation data normalize to RSSI 364 (signal strength of the beacons). Other data elements may include the total samples limited for triangulation 366. Other parking beacon data elements may include the expected lane and lane identification 368. Other parking beacon data elements may include the consecutive samples limit for triangulation 370. Other parking beacon data elements may include the beacon sample depth 372 (e.g., radius of coverage). Hence, one or more of the data attribute elements of the mobile beacon data may include a beacon sample attribute 362, a beacon signal strength attribute 364, a beacon number of samples attribute 366, a beacon expected lane attribute 368, a beacon consecutive sample attribute 370, and a beacon depth attribute 372 (See FIG. 10).

In some implementations, mobile data collection processing module 312 identifies historical data or baseline data stored in computer readable database 316, such that user activities about the parking usages and user mobile parking beacon data collected over time. For historical collection use, the module 312 may create a baseline of the user's parking over a threshold period of operation for the device, such as 12 hours, 24 hours, two-four days, one week, or two to three weeks or more.

In some implementations, the IVR processing module 320 implements suitable programming algorithms to start a parking session and interact with the mobile device 700. In one implementation, IVR processing module 320 may receive a voice call with a unique phone number from a voice communications network and retrieves that the phone number from the Caller ID. IVR processing module 320 may associate the Caller ID with the requested lane for the parking session. In one implementation, a user may call a lane specific phone number in the system 300. Module 320 logically connects with parking processing module 310 to start parking session using attribute data package 350 (see FIG. 10A). IVR processing module 320 may determine the user by the caller phone number associated with the mobile device 700. In some implementations, IVR processing module 320 may determine the garage (e.g., parking structure)

and lane location based on phone number. Each parking lane may have a unique phone number associated with the lane.

Referring to FIGS. 3, 6, 7, and 9, in one implementation, the lane detection processing module 322 electronically locates a user with mobile device 700 in lieu of calling a unique number associated with a parking lane. System 300 and lane detection processing module 322 may measure the Bluetooth signal strength of beacons 900, 910, 920 to determine an approximation of distance to the beacons associated with a lane. Beacons 900a, 910b, and 920c may be located within a parking garage. Some or all of the beacons may be located internal to the parking and/or external to the garage, such as at an entrance 812. One or more of the beacons may also, or alternatively, transmit a signal directly to an offsite remote platform, such as server 304.

In some implementations, the module 322 may employ artificial intelligence using triangulation multivariable equations to determine the predicted physical location of user (e.g., the parker). The beacons 900, 910, 920 can be configured in suitable location identification logic. The system 300 with module 322 is particularly useful in situations where lanes are in close physical proximity to each other. Further, system 300 with module 322 enable the appropriate gate or movable barrier 820 to open for the user of mobile device 700. The movable barrier 820 may be connected to a motor configured pivot the barrier or vertically roll-up in the case of roll-up garage door. It should be noted that system 300 may implement multiple beacons for a location determination of the user with device 700. In a further implementation, the lane detection processing module 322 electronically may locate a user with mobile device 700 and verifies the lane after the user calls a unique number associated with a parking lane. In this way, the lane and the appropriate gate or movable barrier to open of the user of mobile device 700.

Figure 12:
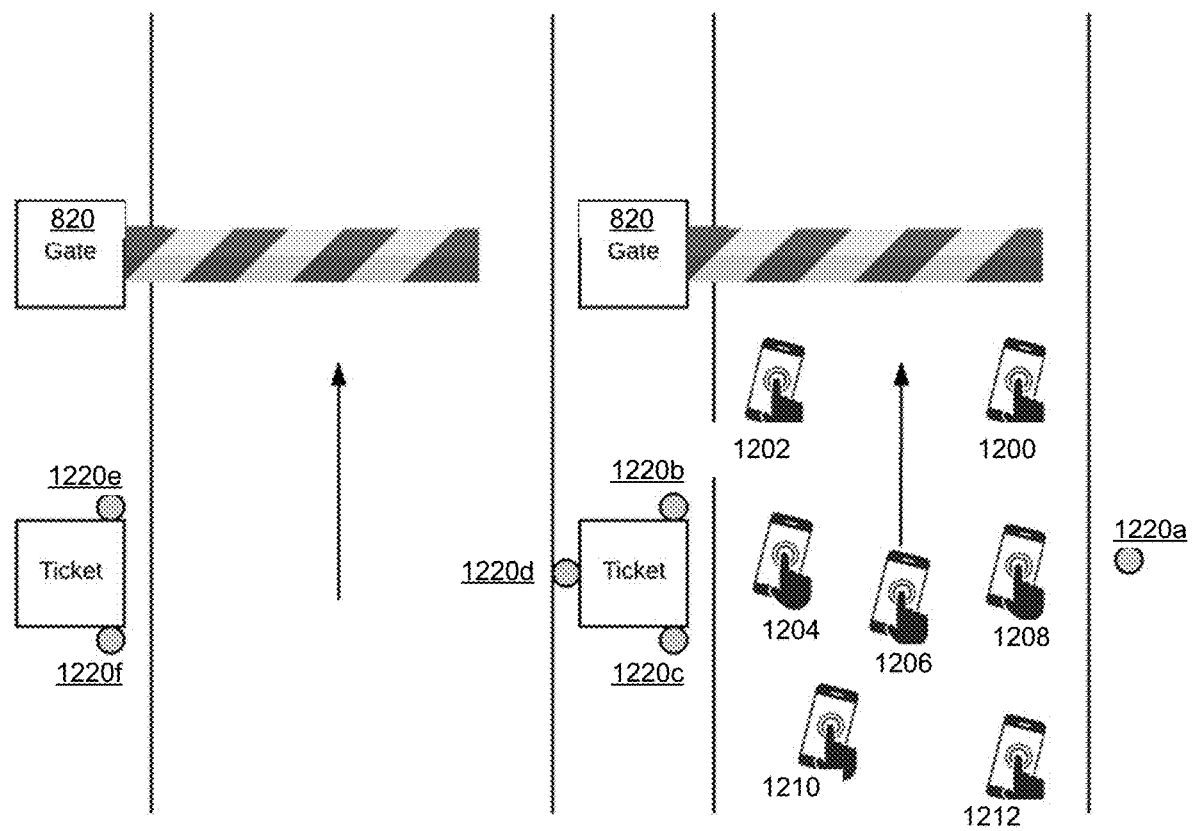
FIG. 12 is an illustrative block diagram of a parking lane environment that may be used to implement the processes and functions of certain embodiments.

In other implementations, land detection processing module 322 may employ expert systems. Since Bluetooth signals are dramatically impacted by environmental factors (such as concrete dividers, metal boxes, signs, and the like) a sampling mechanism may be employed in system 300 with lane detection module 322. Referring to FIG. 12, a sampling mechanism for sampling beacon strength within a lane is shown. Lane detection module 322 implements a computer implemented application that reads relative beacon strengths from varying positions 1200, 1202, 1204, 1206, 1208, 1210, 1212 with the target location for the beacons 1220a-1220f. In one implementation, thousands of samples are measured in real world configurations for each lane. The sample data is analyzed, and an expert system is employed along with machine learning techniques. The expert system considers such factors as relative and absolute signal strengths, signal strength thresholds and filters, minimum and maximum number of samples to read for prediction, thresholds on number of district beacons which can be detected. Lane detection module 322 expert system with a set of rules codified around data to make a prediction of the mobile device 700 lane position, such as at least one probable lane location vector.

In yet other implementations, lane detection processing module 322 electronically processes the data set collected (database 316) in the data collection processing module 312 with the machine learning module 308 based on a machine learning training data set 326 to create at least one most probable lane location vector. Other factors for the training data set 326 may include the samples are taken, and measurements are processed using machine learning techniques. Other factors may include the minimum beacons used for a triangulation sample. Other factors may include the triangulation data normalize to RSSI(signal strength of the beacons). Other factors may include the total samples limited for triangulation. Other factors may include the expected lane and land identification. Other factors may include the consecutive samples limit for triangulation. Other factors may include the beacon sample depth (e.g., radius of coverage).

In some implementations, module 310 sends a push notification to the mobile device 700, such as on device screen 722. System 300 includes module 322 that may send a push notification based on results of machine learning module 308 for lane detection, wherein the mobile devices can receive inquiries, via an automatic push notification or an electronic mail, text messaging via Short Messaging Service (SMS) component of phone, web, or mobile communication systems, using standardized communication protocols that allow the exchange of short text messages between fixed line or mobile phone devices. In another manner, the mobile device 700 receive inquiries via a pull format where the inquirer initiates the query at various steps and the notification can be electronic mail or Short Messaging Service technology for cellular phones.

In some implementations, system 300 may include an electronic messaging element, such as an API for an electronic mail system for notification. In some implementations, the machine learning training data 326 may include a GPS location attribute data element pertaining to a geo-location of the device accessing the network (global positioning system (GPS) data), and including the time of period of the day (e.g., increments of only two, four, or six hours, such morning, afternoon, evening) and other similar data. The GPS location associated with GPS location attribute data may have at least the longitude and latitude of the location to linked to a mapping application.

Referring to FIG. 3, garage adaptation module 324 provides for interface devices to garage hardware. The module 324 may provide interfaces for "detect presence of a car in a lane"; "Raise or close a gate arm"; "count entry and exist events in the garage". Module 324 may have one or more hardware processors configured by machine-readable instructions.

In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable a user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302. The system 300 API components may be provided in the AWS cloud and have been architected to scale in a resilient manner through the use of technologies chosen without any legacy dependencies.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 320 322, and/or 324 are illustrated in FIG. 3 as being implemented within a single processing unit, in implementations in which processor(s) 318 includes multiple processing units, one or more of modules 308, 310, 312, 320, 322 and/or 324 may be implemented remotely from the other modules. The description of the functionality provided by the different modules 308, 310, 312, 320 and/or 322, 324 described below is for illustrative purposes, and is not intended to be limiting, as any of modules 308, 310, 312, 320, 322, and/or 324 may provide more or less functionality than is described. For example, one or more of modules 308, 310, 312, 320, 322 and/or 324 may be eliminated, and some or all of its functionality may be provided by other ones of modules 308, 310, 312, 320 and/or 322, 324. As another example, processor(s) 318 may be configured to execute one or more additional modules that may perform some or all of the functionality attributed below to one of modules 308, 310, 312, 320, 322 and/or 324.

Figure 4A:
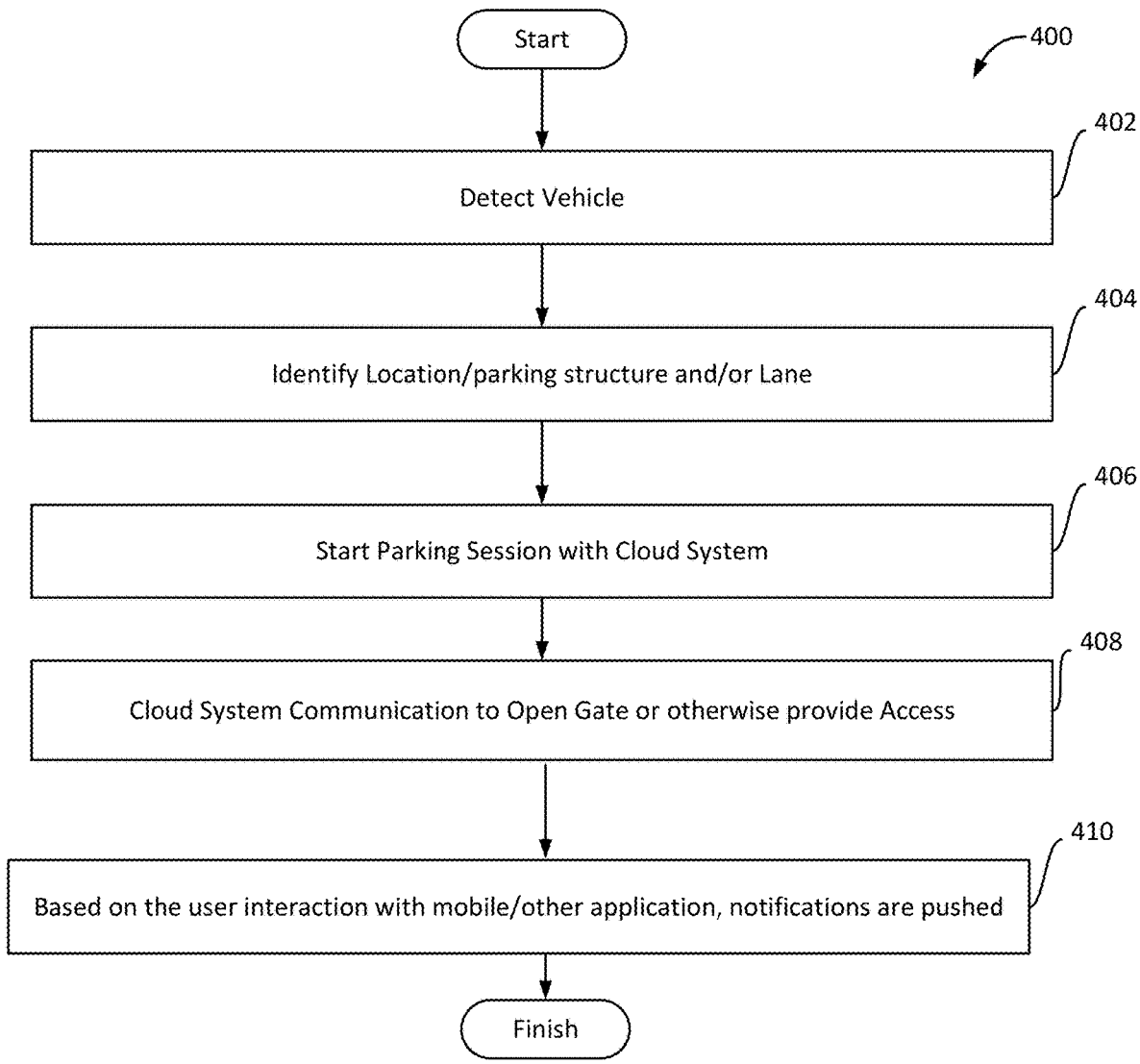
FIGS. 4A and 4B illustrate a method of data communication and processing, in accordance with one or more implementations.

FIGS. 4A and/or 4B illustrate a method 400 for data communication, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and/or 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more implementations. An operation 402 may include as the user drives up to the gate 820, a loop detects car, system 300 receives an alert that a car at the gate 820. Notifications are transmitted or routed to the target or designation application to the mobile device 700 of the user. Operation 402 may be performed by one or more hardware processors configured by machine-readable instructions including module that is the same as or similar to parking processing module 310 and module 312 in accordance with one or more implementations.

An operation 404 may include identifying the location, parking structure and/or lane via with call to park technology in accordance with the present disclosure. IVR processing module 320 may receive a phone call associated with a lane specific phone number from the user with mobile device 700 at the parking facility. Each parking lane may have a unique phone number associated with the lane. Operation 404 may be performed by one or more hardware processors configured by machine-readable instructions including a module that is the same as or similar to IVR processing module 320, in accordance with one or more implementations.

An operation 406 may include electronically processing to initiate a parking session with system 300. IVR processing module 320 is electronically and logically connected to parking processing module 310 and may use start_parking_session attribute data 350 relating to a unique user ID 352. Module 320 may determine a user by ANI (assigned number) technology (commonly known as caller ID) phone number and populated by user ID 352 with the 10 or 11 digit number. In a further implementation, IVR processing module 320 may determine the parking structure (e.g., garage or lot or other car storage apparatus) and lane based on the unique phone number assigned to the lane and parking structure. The lane ID attribute data 353 may be populated with the unique phone number of the parking lane. The channel ID attribute may be populated with method of accessing the parking system 300. (e.g., call to park or beacon app). Vehicle attribute 356 pertains to the vehicle ID (in the case of multiple vehicles) of the user of the mobile device 700. Operation 406 may be performed by one or more hardware processors configured by machine-readable instructions including a module that is the same as or similar to module 320 and module 310, in accordance with one or more implementations.

An operation 408 may include further including the system 300 communications to message to open gate 820 or otherwise process access control. In one implementation, parking processing module 310 may send a data message to open gate 820 to a movable barrier processor of IO board 610 at the gate 820. The IO board 610 is configured send and open command to gate. (See FIG. 6) Operation 408 may be performed by one or more hardware processors configured by machine-readable instructions including a module that is the same as or similar to module 310, in accordance with one or more implementations.

An operation 410 may include further including the system 300 receiving a notification that car has driven open the safety loop so as to start parking session upon entry into the parking facility. Operation 410 may include electronically providing a parking session status communicated back to mobile device 700 of user via push notification, SMS or the method, such as a voice call by IVR processing module 320. In one implementation, a secure link may be provided access parking status. The user can access parking status on mobile web or use an application specific software. Operation 410 may be performed by one or more hardware processors configured by machine-readable instructions including a module that is the same as or similar to module 310 and/or module 320, in accordance with one or more implementations.

Figure 4B:
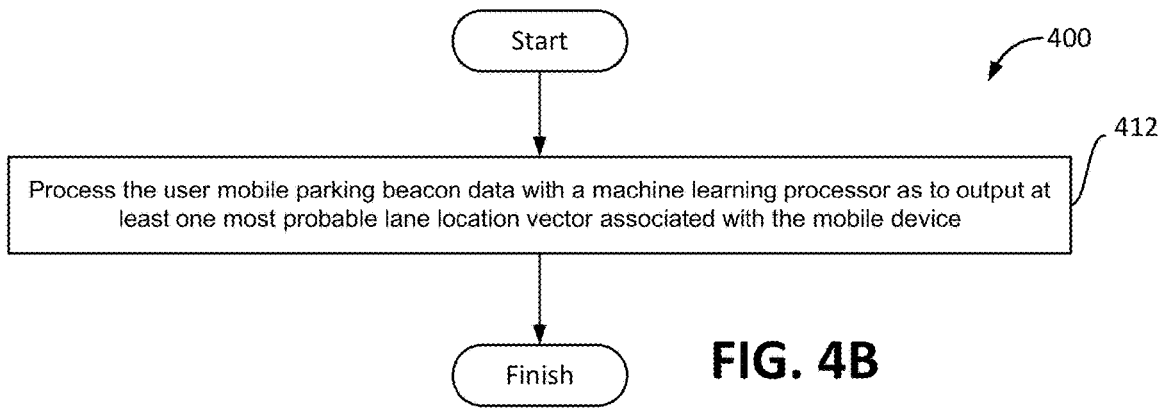

FIG. 4B illustrates method 400, in accordance with one or more implementations. An operation 412 may include electronically receiving one of more user mobile parking beacon data 360 with module 312 and storing the user mobile parking beacon data in a computer readable database 316 pertaining to mobile device 700. Operation 412 may further include processing the user mobile parking beacon data 360 with a machine learning processor using module 308 as to output at least one most probable lane location vector 550 associated with the mobile device 700.

Operation 412 may be configured to electronically output the at least one probable lane location vector 550 or at least one most probable lane location vector to a parking processing module 310. In one implementation, the operation 412 may be implemented in lieu of operation 404 such that the user may optionally not call the lane phone number to start a parking session. In that implementation, the operations 406, 408, and 410 sequence from operation 412. In another implementation, the operation 412 may be implemented in conjunction with operation 404 or during operation 400 to provide enhanced lane determination. In that implementation, operations 412 and 404 during or conjunction, the operations 406, 408, and 410 sequence after the operations 404 or 412. Operation 412 may be performed by one or more hardware processors configured by machine-readable instructions including a module that is the same as or similar to module 312, 322 and machine learning module 308, in accordance with one or more implementations.

Figure 7:
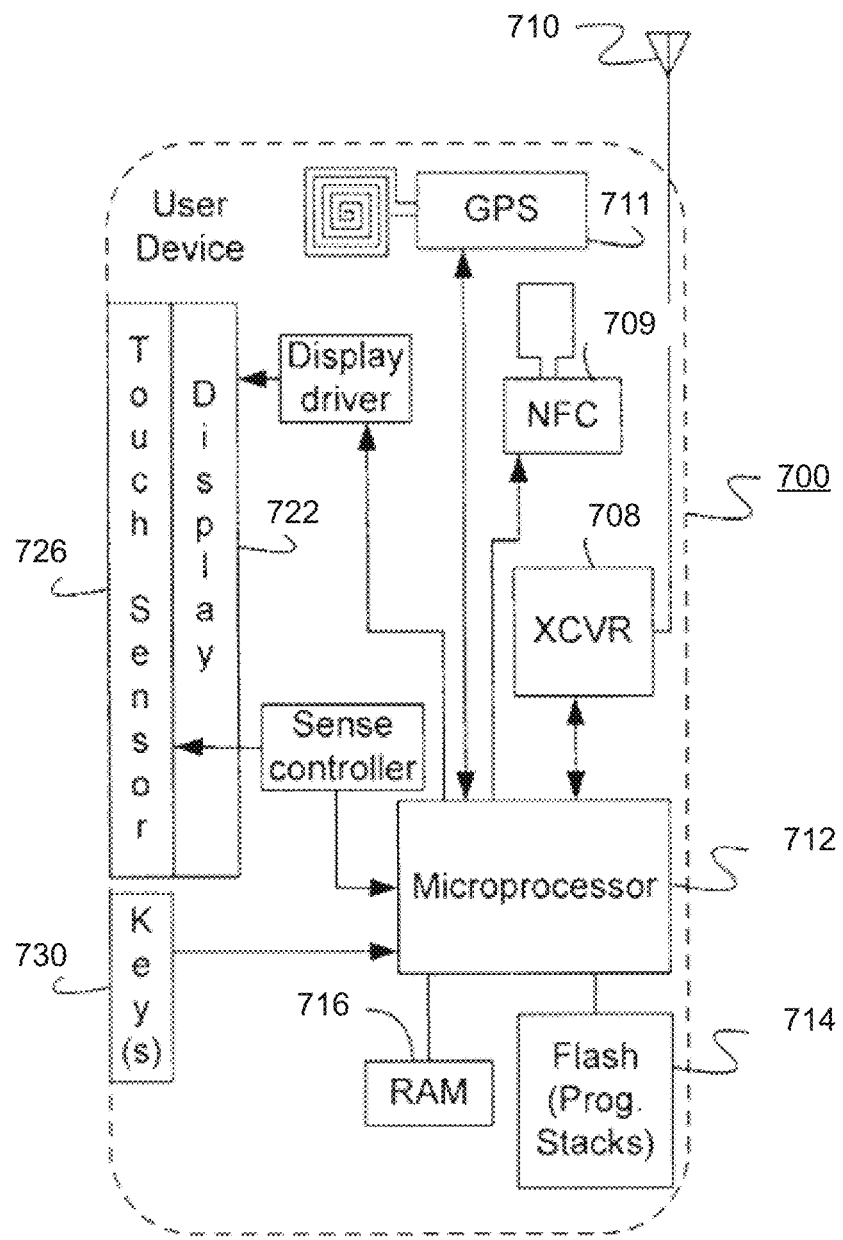
FIG. 7 is an illustrative block diagram of a mobile digital computing environment that may be used to implement the processes and functions of certain embodiments.

FIG. 7 provides a block diagram illustration of an exemplary user device 700. Although the user device 700 may be a smart-phone, a tablet, or another type of device, the illustration shows the user 700 is in the form of a handset (although many components of the handset, such as a microphone and speaker, are not shown).

Referring to FIG. 7, for digital wireless communications, the user device 700 includes at least one digital transceiver (XCVR) 708 connected to an antenna 710 that receives data packets uploads and downloads using cell tower transmissions with an information alert (e.g., push notification) from an Over-The-Air Transmitter. The transceiver 708 provides two-way wireless communication of information, such as digital information, in accordance with the technology of the network 210. The transceiver 708 also sends and receives a variety of signaling messages in support of the various services provided via the user device 700 and the communication network. The user device 700 also includes an NFC interface 709 having an associated antenna and configured for communicating using near-field communication with other devices such as with an NFC reader. The user device 700 includes a display 722 for displaying messages, menus or the like, user related information for the user, etc. A touch sensor 726 and keypad 730 enables the user to generate selection inputs, for example.

A microprocessor 712 serves as a programmable controller for the user device 700, in that it controls all operations of the user device 700 in accord with programming that it executes, for all normal operations, and for operations involved in the real-time parking guidance service. In the example, the user device 700 includes flash type program memory 714, for storage of various program routines and configuration settings. The user device 700 may also include a non-volatile random access memory (RAM) 716 for a working data processing memory. In a present implementation, the flash type program memory 714 stores any of a wide variety of applications, such as navigation application software and/or modules 308, 310, 312, 320, and 322. The memories 714, 716 also store various data, such as input by the user. Programming stored in the flash type program memory 714 is loaded into and executed by the microprocessor 712 to configure the processor 712 to perform various desired functions, including functions involved in push notification processing.

In some examples, the user device 700 further includes a GPS interface 711 coupled to a GPS antenna designed to receive GPS location signals transmitted by satellites. The GPS interface 711 is communicatively coupled to the microprocessor 712, and is operative to provide location information to the microprocessor based on the received location signals.

In one construction, a biometric device system located in Device 700 may be included to enable for securely storing in the device biometric data unique to the user, and/or securely storing in the device behavioral/gating data associated with the user. The electronic biometric data and behavioral/gating data can be maintained, or otherwise stored within a memory/database, such as memory 714 and/or RAM 105 as shown in FIG. 1 in which memory in located within the device (e.g., smart phones).

Figure 8:
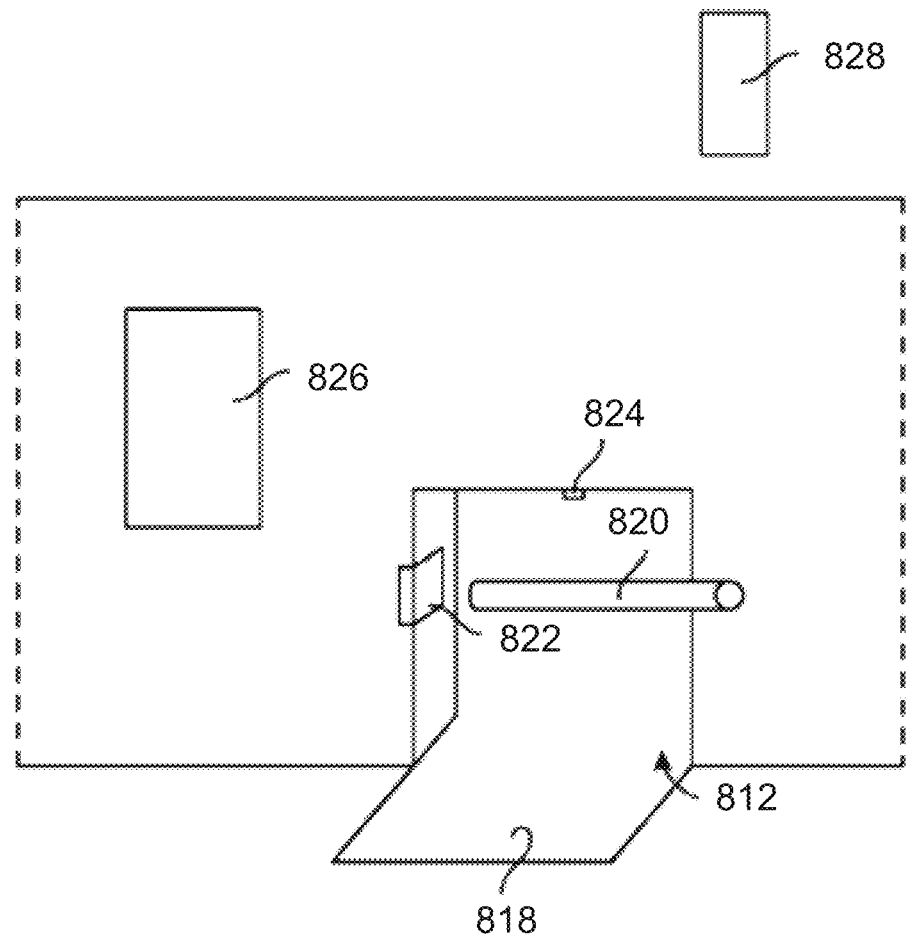
FIG. 8 is an illustrative block diagram of a parking environment that may be used to implement the processes and functions of certain embodiments.
Figure 9:
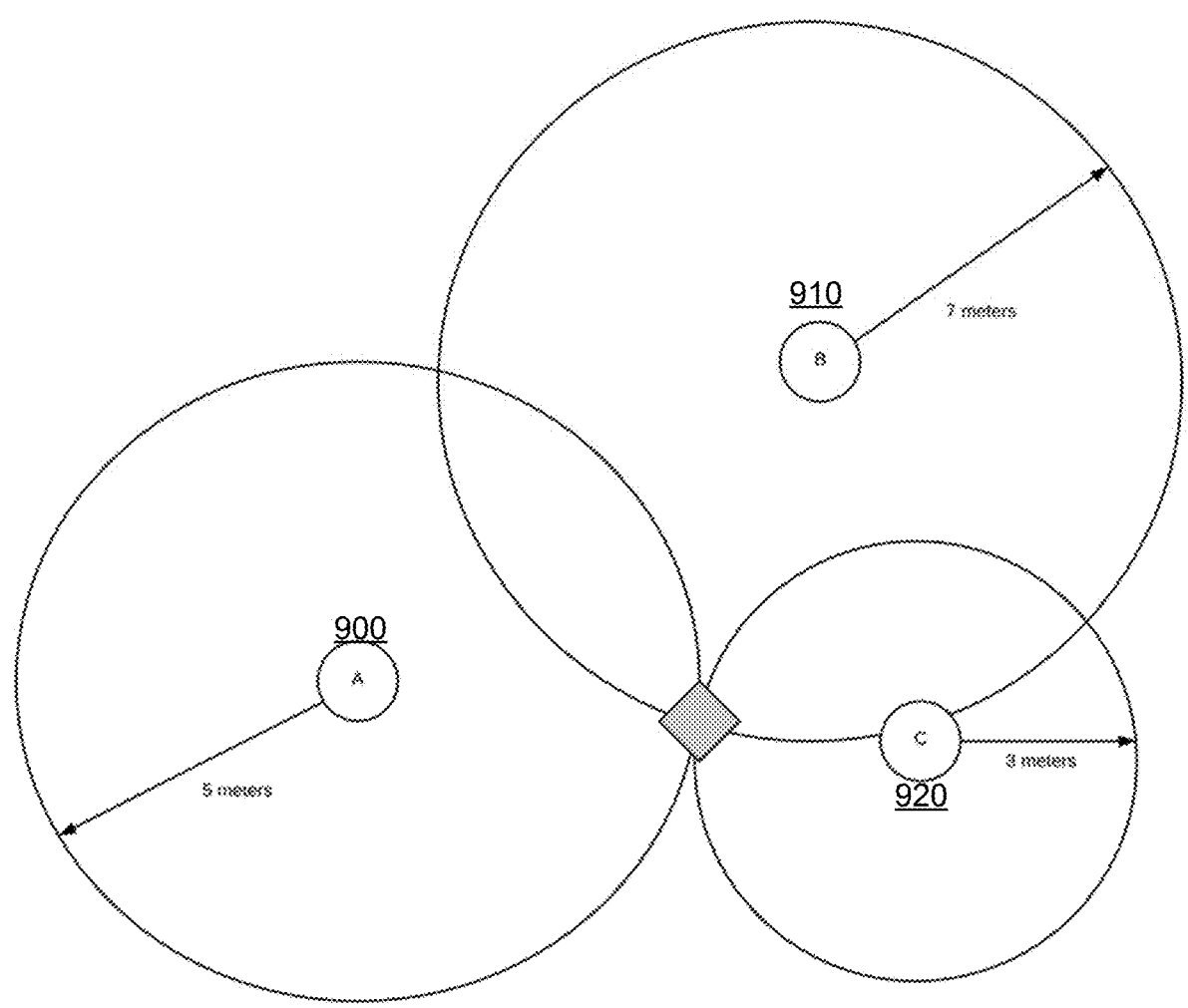
FIG. 9 is an illustrative block diagram of a beacon environment that may be used to implement the processes and functions of certain embodiments.

FIG. 8 depicts a garage entrance/exit 812 with access 818 to a city street. Typical features associated with the entrance/exit 812 are a pivoting gate 820 to control the ingress and egress of vehicles, a camera 822 to record the entrance and exit of vehicles and to document damage to the body of those vehicles, a one or more detectors 824 such as a bar code scanner or a radio frequency identification (RFID) scanner that identifies cars entering or leaving the garage, and a display board 826 that provides information to potential customers, such as price and availability of parking spaces.

Alternatively, detector 824 can be a beacon device 900, 910, 920 (see FIG. 9) in the present disclosure which emits a signal to the phone application, letting the application know that the customer is in that particular garage, passing the garage information to the application to allow it to check-in/out the customer. Other garages may be "open" lots, either allowing self-paring or requiring an attendant to take the car at the entrance and park it within the facility.

In self-park facilities with gated or attendant controlled entry/exit, System 300 users can scan their QR or barcode for entry and exit via scanners at the entry and exit points (self-serve or via any attendant on premises), with final amount due charged automatically to a credit card stored in the user profile. System 300 users can alternatively be charged using any other suitable garage point-of-sale system.

Alternatively, system 300 can leverage existing Smartphone "touch to open" technology to allow system 300 users to touch their phone across a sensor to open gates at gated facilities upon arrival, at which time the parking duration starts counting and parking costs accrue based on stored information and logic in the system 300 system. Upon departure, the same "touch to open" technology can be leveraged to open the exit gate, end the parking stay and the parking cost accrual. system 300 can keep track of current parking costs throughout the stay and display this information to the user, along with any upcoming rate changes, as well display final parking costs and execute payment via a credit card processor. This information may transmit via an API to modules or other suitable garage point-of-sale system. A server 828 may be located elsewhere in the garage, such as in an office, communicates with the features and with other garages to enhance parking efficiency. Communication is via a digital network 210 and may include wired or wireless communications connected to remote platform or portal 314 (see FIG. 3).

Figure 11:
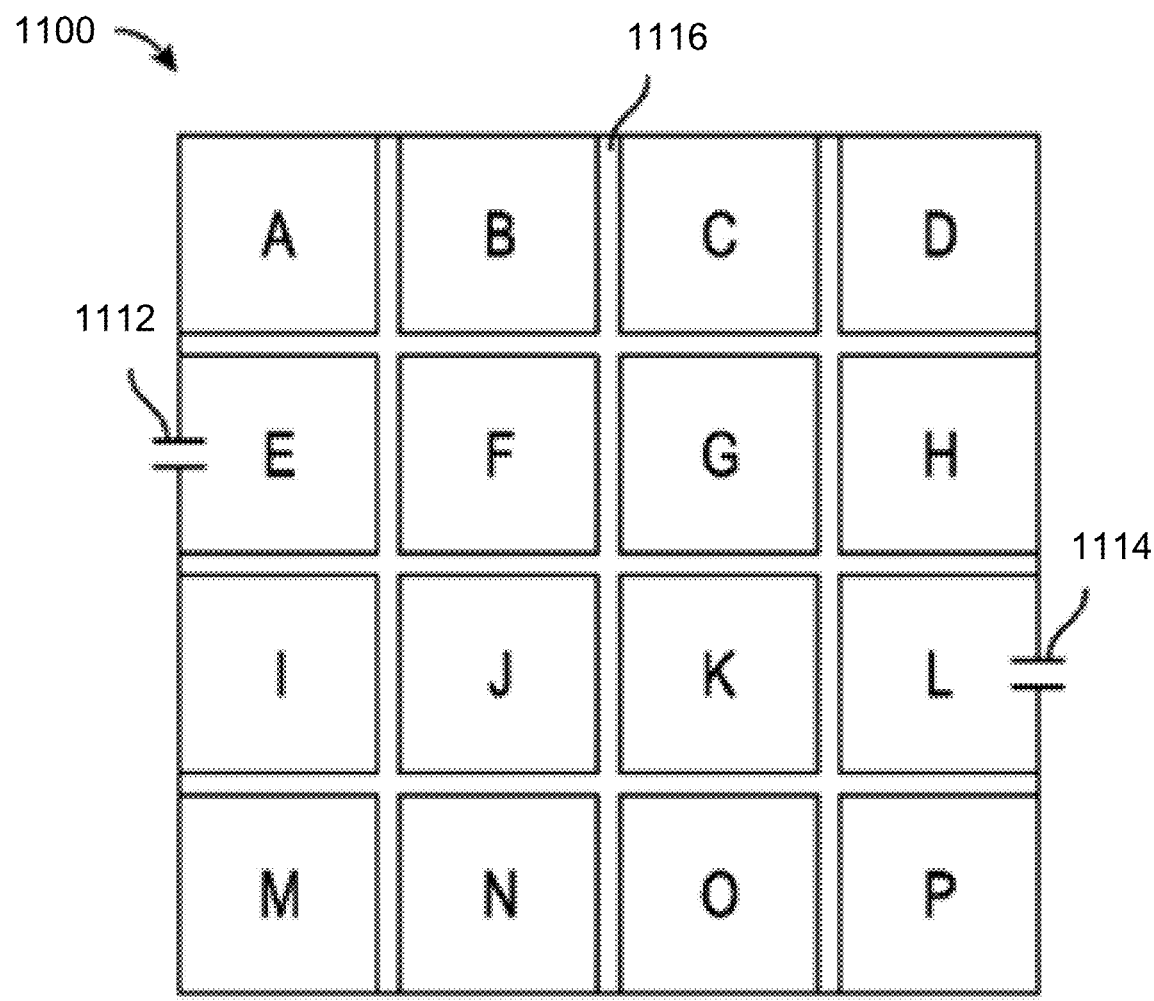
FIG. 11 is an illustrative block diagram of a parking environment that may be used to implement the processes and functions of certain embodiments.

One of more aspects of the present disclosure relates to a system configured for mobile data communication dealing with one or more parking garages or parking structures. FIG. 11 depicts one floor of a commercial parking garage. It is recognized that non-commercial parking garages have multiple floors connected by ramps and/or elevators. There are one or more entrances/exits 1112, 1114 providing access between the garage and adjacent city streets, if on the ground floor or providing access to ramps if on a floor above or below ground level. The floor 1100 is divided into a plurality of parking sectors (A-P) that each contain a plurality of parking spaces. Internal roadways 1116 enable vehicles being parked to be driven to a desired parking sector. One factor drivers consider when selecting a parking garage is efficiency in delivering a car when the user is ready to leave. The higher the efficiency, the more likely a user is to return to that garage. Accordingly, cars belonging to users expected to request their car soon are parked close to a garage entrance/exit 1112/1114, for example, in sector E or F. Cars expected to remain in the garage for a more extended period of time are parked in sectors more remote from the garage entrance/exit, for example, in sector C or N. During the business day, cars are moved between sectors in anticipation of user demand to increase garage efficiency.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for data communication, the system comprising:
   one or more hardware processors configured by machine-readable instructions to:
   electronically receiving a plurality of user mobile data associated with a mobile communication device;
   electronically sampling a plurality of user mobile parking beacon data including multiple geolocations and storing user mobile parking sampling beacon data in a computer readable database associated with the mobile communication device;
   triangulation processing the user mobile parking sampling beacon data with a machine learning processing module;
   responsive thereto, electronically outputting at least one probable lane location vector data associated with the mobile communication device; and
   electronically transmitting the at least one probable lane location vector data to a parking processing module and a barrier processing module;
   wherein the one or more hardware processors are further configured by machine-readable instructions to further comprise electronically receiving a network call from a voice communications network and the network call being assigned to the barrier processor and electronically determining a network address associated with the network call.

2. The system of claim 1, wherein the one or more hardware processors are further configured by machine-readable instructions to further comprise electronically transmit a digital command to the barrier processor to engage a movable barrier associated with the at least one probable lane location vector data.

3. The system of claim 1, wherein the learning processor module comprises deep machine learning.

4. The system of claim 1, wherein the one or more hardware processors are further configured by machine-readable instructions to further comprise electronically transmit a data packet to the parking processing module, wherein the data packet includes at least one lane attribute data element and at least one channel attribute data element.

5. The system of claim 1, wherein the user mobile parking beacon data includes at least one expected lane attribute data element.

6. The system of claim 1, wherein the user mobile parking beacon data includes at least one beacon signal strength attribute data element.

7. The system of claim 1, wherein the one or more hardware processors are further configured by machine-readable instructions to further comprise electronically transmit a digital command to the barrier processor to open a movable barrier associated with the at least one probable lane location vector data and the network address.

* * * * *